(12) United States Patent
Ricketts et al.

(10) Patent No.: US 8,286,798 B2
(45) Date of Patent: *Oct. 16, 2012

(54) CORN COB CLEANING CONVEYOR SYSTEM

(75) Inventors: Jonathan E. Ricketts, Ephrata, PA (US); John J. Borsdorf, Leola, PA (US); Kenneth W. Brown, Port Byron, IL (US); Joshua D. Werning, Mt. Wolf, PA (US); Tyler Nelson, Rochester, MN (US)

(73) Assignee: CNH America LLC, New Holland, PA (US)

( * ) Notice: Subject to any disclaimer, the term of this patent is extended or adjusted under 35 U.S.C. 154(b) by 28 days.

This patent is subject to a terminal disclaimer.

(21) Appl. No.: 12/850,744

(22) Filed: Aug. 5, 2010

(65) Prior Publication Data

US 2011/0034222 A1    Feb. 10, 2011

Related U.S. Application Data

(60) Provisional application No. 61/273,720, filed on Aug. 7, 2009.

(51) Int. Cl.
*A01F 12/48* (2006.01)
*B07B 11/00* (2006.01)

(52) U.S. Cl. .......... 209/138; 209/639; 209/923; 460/42; 460/44

(58) Field of Classification Search .................. 209/138, 209/139.1, 154, 639, 644, 922, 923; 460/42, 460/44, 97, 99
See application file for complete search history.

(56) References Cited

U.S. PATENT DOCUMENTS

| 257,753 A | * | 5/1882 | Phillips ............................ 460/99 |
|---|---|---|---|
| 497,693 A | | 5/1893 | Taylor |
| 1,436,428 A | | 11/1922 | Kutscha |
| 1,600,212 A | | 9/1926 | Berger |
| 1,849,756 A | | 3/1932 | Grossman |
| 2,080,717 A | | 5/1937 | Hitchcock |
| 2,306,753 A | * | 12/1942 | Ronning ........................ 209/21 |
| 2,761,578 A | | 9/1956 | Brownlee et al. |
| 2,797,001 A | | 6/1957 | Smith |
| 2,885,209 A | | 5/1959 | Bruecker |
| 3,014,729 A | | 12/1961 | Henningsen et al. |
| 3,213,857 A | * | 10/1965 | Ashton et al. ................... 460/99 |
| 3,241,657 A | | 3/1966 | Buschbom |
| 3,324,859 A | | 6/1967 | Bossard |
| 3,721,333 A | | 3/1973 | Boone |

(Continued)

FOREIGN PATENT DOCUMENTS

EP    1606990    12/2005

(Continued)

*Primary Examiner* — Joseph C Rodriguez
(74) *Attorney, Agent, or Firm* — Michael G. Harms

(57) ABSTRACT

The cob cleaning conveyor system provides a capability for positively removing or cleaning lighter crop residue from a flow of cobs. The system can be incorporated with a cob collection device, such as on a trailer, and can be adjustable in several ways for accommodating varying corn varieties, conditions and the like. The system includes a first conveyor which propels the flow into a gap or passage toward a second conveyor, while a flow of air is directed downwardly through the passage to remove or clean the lighter residue material from the cobs. The angle of attack of the air flow can be selectable, and optionally be directed downwardly along the second conveyor to the passage, and upwardly along the second conveyor to travel with or follow the residue flow, to suit present conditions.

25 Claims, 14 Drawing Sheets

U.S. PATENT DOCUMENTS

| | | | |
|---|---|---|---|
| 3,727,617 A | 4/1973 | Hadley et al. |
| 3,833,006 A | 9/1974 | Temple |
| 3,874,609 A | 4/1975 | Larson |
| 3,952,889 A | 4/1976 | Wanker et al. |
| 4,340,070 A | 7/1982 | Keitel |
| 4,589,425 A | 5/1986 | Mitchell, Jr. |
| 4,642,977 A | 2/1987 | Ramacher |
| 4,662,812 A | 5/1987 | Busboom et al. |
| 4,846,621 A | 7/1989 | Warsaw |
| 4,958,756 A | 9/1990 | Conway |
| 5,103,623 A | 4/1992 | Herrett |
| 5,176,573 A | 1/1993 | Dow |
| 5,256,106 A | 10/1993 | Shrawder |
| 5,528,890 A | 6/1996 | Gray et al. |
| 5,538,388 A | 7/1996 | Bergkamp et al. |
| 5,558,576 A | 9/1996 | Meyers |
| 5,839,954 A | 11/1998 | Schloesser et al. |
| 5,865,675 A | 2/1999 | Meester |
| 5,930,987 A | 8/1999 | Urich et al. |
| 5,941,768 A | 8/1999 | Flamme |
| 5,980,189 A | 11/1999 | Rubner |
| 6,042,326 A | 3/2000 | Thomas et al. |
| 6,050,073 A | 4/2000 | Nevarez, Sr. |
| 6,358,141 B1 | 3/2002 | Stukenholtz et al. |
| 6,767,174 B2 | 7/2004 | Cresswell |
| 7,018,290 B2 | 3/2006 | Ramon et al. |
| 7,134,830 B2 | 11/2006 | Wood |
| 7,166,027 B2 | 1/2007 | Messenger |
| 7,168,554 B2 | 1/2007 | Brandt |
| 7,413,507 B2 | 8/2008 | Weichholdt |
| 7,494,409 B2 | 2/2009 | Voss et al. |
| 7,645,190 B2 * | 1/2010 | Schwinn et al. | 460/6 |
| 7,717,778 B2 | 5/2010 | Redekop et al. |
| 7,837,542 B1 * | 11/2010 | Ricketts et al. | 460/99 |
| 7,927,198 B2 * | 4/2011 | Redekop et al. | 460/99 |
| 2008/0261671 A1 | 10/2008 | Stukenholtz et al. |
| 2009/0095662 A1 | 4/2009 | Redekop et al. |
| 2009/0104952 A1 | 4/2009 | Redekop et al. |
| 2009/0124309 A1 | 5/2009 | Redekop et al. |

FOREIGN PATENT DOCUMENTS

| | | |
|---|---|---|
| GB | 2035822 | 6/1980 |
| JP | 5168324 | 7/1993 |
| JP | 6078627 | 3/1994 |
| WO | 91/05460 | 5/1991 |

* cited by examiner

CORN COB CLEANING CONVEYOR SYSTEM

This application claims the benefit of U.S. Provisional Application No. 61/273,720, filed Aug. 7, 2009.

TECHNICAL FIELD

This invention relates generally to a cob conveying system adapted for use with a corn harvester, which more particularly incorporates a capability for positively removing or cleaning husks and other lighter residue from the cobs using directed flows of air.

BACKGROUND ART

U.S. Provisional Application No. 61/273,720, filed Aug. 7, 2009, is incorporated herein by reference in its entirety.

Presently, there is an increased demand for corn cobs as a feedstock for cellulosic ethanol, as well as other uses. As a result, there is heightened interest in collecting corn cobs during corn harvest. There is also concern by some that cob collection may reduce soil nutrient content. In this regard, crop residue or stover, e.g., corn stalks, leaves, husks and cobs, are traditionally left on the field after harvest, and break down over time to replenish soil nutrients. If a component of the residue, e.g., cobs is instead collected, nutrient levels could be lowered as a result. To mitigate this concern, some consider it desirable when collecting cobs, to collect mainly only the cobs, and leave the other residue of the harvesting operation, e.g., lighter residual husks and leaves, on the filed with the stalks. Thus, it is sought to have a cob conveyor system adapted for operation in connection with a corn harvester, which incorporates an ability to separate or clean the cobs from the other lighter residue, and return the other residue to the field or another location. It is also desirable for the collected cobs to be compact, e.g., without loose husks, leaves and the other residue, so as to increase the amount of cobs that the collection device and subsequent containers can hold. Still further, for some techniques for producing ethanol from corn cobs, the presence of substantial amounts of other residue, e.g., loose husks and the like, is undesired, and for a load of cobs of a given volume, the amount of compensation paid will be reduced if significant residue is present. Also in this regard, the producer, e.g., farmer, may be required to pay transportation costs for the cobs, and if significant other residue is present, the farmer will be paying to transport materials for which no compensation is received and the unwanted residue material will displace wanted cobs in the transported loads.

Numerous apparatus have been proposed for use in connection with cob collection devices, for cleaning or separating cobs from the other residue. To illustrate, prior to the early 1960's, the common corn harvesting practice involved picking the ears of corn in the field, removing husks from the ears, and transporting the ears still containing the corn kernels to a corn crib, and later shelling the corn off of the cobs at a stationary sheller. This harvesting procedure has been almost entirely replaced by modern self-propelled combine type harvesters, which separate and collect the corn kernels, and discharge the cobs and other stover onto the field.

More recently, a variety of devices have been proposed for harvesting and cleaning cobs. Reference in this regard, Flamme, U.S. Pat. No. 5,941,768, issued Aug. 24, 1999; Redekop et al., U.S. Patent Publication No. 20090095662 A1, published Apr. 16, 2009; Redekop et al., U.S. Patent Publication No. 20090104952 A1, published Apr. 23, 2009; and Redekop et al., U.S. Patent Publication No. 20090124309 A1, published May 14, 2009, which variously propose cob and residue conveyor systems with apparatus for blowing or sucking air upwardly through a flow of corn residue falling over the end of a conveyor or conveyors.

Some embodiments disclosed in the above referenced patent and publications utilize fans located below the falling residue and operable for directing flows of air upwardly therethrough for carrying the lighter residue upwardly and into a hood that then directs the air and residue downwardly beside the apparatus to the field. However, observed shortcomings of these embodiments include that the air flows generated must be sufficiently powerful to blow through the falling cobs and lift the other residue and carry it upwardly, then change direction to carry it downwardly. The blower fans for accomplishing this are also located beneath the conveyors, such that heavier material can fall into the blower fans or cover grates covering the fans, to impede operation thereof and possibly cause damage thereto. There is also no provision disclosed for directing the residue onto the field below the apparatus, such that uneven residue coverage can result.

Other embodiments disclosed in the above references utilize air plenums having discrete nozzles directed for discharging air flows upwardly into the falling corn residue for separating the lighter residue from the falling cobs. Observed shortcomings of these arrangements include that there will be regions of the crop residue flows between the nozzles that will not be adequately covered. And it is possible that the flow from the nozzles will be inadequate to lift and carry the residue from the cobs. It is also observed that the nozzles may become clogged and require servicing.

In another embodiment of the above references a fan located above or beside the conveyors sucks the lighter residue from the cobs. However, again, the residue must be lifted. Also, the residue must pass through or be diverted from the fan. And, if the fan is located only on one side of the apparatus, the residue will be discharged to one side only, resulting in uneven coverage.

Thus, what is sought is a cob conveyor system which incorporates a cleaning capability for operation in association with a conveyor harvester, which provides one or more of the capabilities, namely, positively separating husks and other lighter elements of corn residue from the cobs, and which overcomes one or more of the shortcomings and disadvantages, set forth above.

SUMMARY OF THE INVENTION

What is disclosed is a cob conveyor system which incorporates a cleaning capability for operation in association with a conveyor harvester, which provides one or more of the capabilities, namely, positively separating or cleaning husks and other lighter elements of corn residue from the cobs, and which overcomes one or more of the shortcomings and disadvantages, set forth above.

According to a preferred aspect of the invention, the cob conveyor system is used in association with a collection device or apparatus including a container which is preferably an upstanding wall structure bounding an interior chamber or cavity for receiving and holding a quantity of cobs. The upstanding wall structure includes a predetermined wall having an upper region including an aperture or opening therein.

According to another preferred aspect, the conveyor system is configured and operable for receiving a flow of the cobs from a harvester, mixed with other residue, which will be lighter than the cobs and include namely husks, portions of husks, leaves, and fragments of stalks and cobs.

As another preferred aspect of the invention, the collection device or container and conveyor system are carried on a trailer configured for towing behind a harvesting machine, e.g., a combine, for receiving the flow of the cobs therefrom, and the conveyor portion includes an inclined upwardly portion for elevating a flow of the cobs and other residue to an upper region of the collection device or container. A first conveyor is positioned forwardly of a second conveyor. A gap or spacing forms a passage between the first and second conveyors. The size of the gap or passage can be any distance between the first and second conveyors through or across which the first conveyor can propel the corn cobs, and can include a distance whereby the first and second conveyors are overlapping one another.

The gap or passage between the first and second conveyors enables a cleaning fan to direct air or other fluid downwardly toward and through the flow of cobs and other lighter residue as it is propelled through the gap or passage. The fan output will have an angle of attack which will be counter to the direction of residue flow, or across it, and is configured to redirect the lighter elements of residue, mainly which are of a dry, paper like consistency, downwardly out of the conveyor system, while allowing the cobs, which are heavier and bulkier, to continue on to the second conveyor. In this regard, it has been found that the lighter, paper like elements of residue have little momentum when propelled from the first conveyor into the gap or passage, and a large surface area relative to their mass, and thus are more easily redirected by the counter or cross flow of air, whereas the heavier cobs have greater momentum, and are more aerodynamic, so as to be capable of flight through the counter or cross flow. The lighter elements are discharged onto the ground below or about the conveyor system.

Also according to the invention, the outlet of the fan can be selectively positioned at a plurality of angles to direct the air flow into the residue flow from a plurality of different angles, ranging from directly counter to the residue flow, to perpendicular thereto. This is advantageous because different angles of air flow will produce different amounts of air flow delivered to the flow of residue, and thus the air flow characteristics can be adapted or customized for a particular application. Moreover, the fan can be selectively positioned to direct air flow to either the first or second conveyors, as desired or required for achieving the cleaning effect sought. As an advantage, the flow of corn residue can be advantageously agitated by the air flow in combination with an angle of inclination of the receiving conveyor, e.g., by tumbling and rolling, to release or free the lighter elements of residue, so as to be carried away by the air flow in combination with gravity.

In an alternative embodiment, the fan can be selectively moveable between a first position directing the air flow to the first conveyor, and a second position directing the air flow to the second conveyor, or a diverter provided, to enable a portion of the air flow to follow the flow of the cobs and residue as it travels from the first conveyor to the second conveyor.

In another embodiment, the fan can be selectively moveable between a first position directing the air flow to the region of the gap or passage that is adjacent to the first conveyor, and a second position directing the air flow to the region of the gap or passage adjacent to the second conveyor, in order to follow the flow of the cobs and residue as it travels from one end of the gap or passage to another end.

The flow of cobs and residue passing through the gap or passage between the first and second conveyors can be selectively controlled by increasing or decreasing the speeds of the first and second conveyors. For instance, it is possible by increasing the speed of the second conveyor, to increase the agitation or tumbling effect for releasing the lighter elements of residue from the cobs.

In another embodiment of the present invention, a fan is disposed between an upper region of the second conveyor and the container. A gap or passage is formed between the upper region and the trailer. The gap or passage between the second conveyor and the container enables the cleaning fan to direct air or other fluid downwardly toward the crop passing through the gap. The outlet of the fan is directed generally downwardly to direct the air generally downwardly onto the crop to remove or dislodge husks and other lighter elements of the corn residue from the corn cobs. The outlet of the fan can be selectively positioned at a plurality of angles to direct the air flow onto the flow of residue from a plurality of different angles. This is advantageous because different angles of air flow will produce different amounts of air flow delivered to the flow of residue. Moreover, the fan can be selectively positioned to direct air flow to either the second conveyors or the container.

In an alternative embodiment of the invention, the fan can be selectively moveable between a first position directing air flow to the upper region of the second conveyor, and a second position directing air flow to the container, or a diverter provided for directing a portion of the air flow toward the container, in order to follow the flow of the residue as it travels from the second conveyor to the container.

The flow of crop passing through the gap or passage between the second conveyor and the container can be selectively controlled by increasing or decreasing the speed of the second conveyor.

Fans at two locations, between the first and second conveyor, and between the second conveyor and the container, can also be utilized.

DETAILED DESCRIPTION OF THE INVENTION

Figure 1:
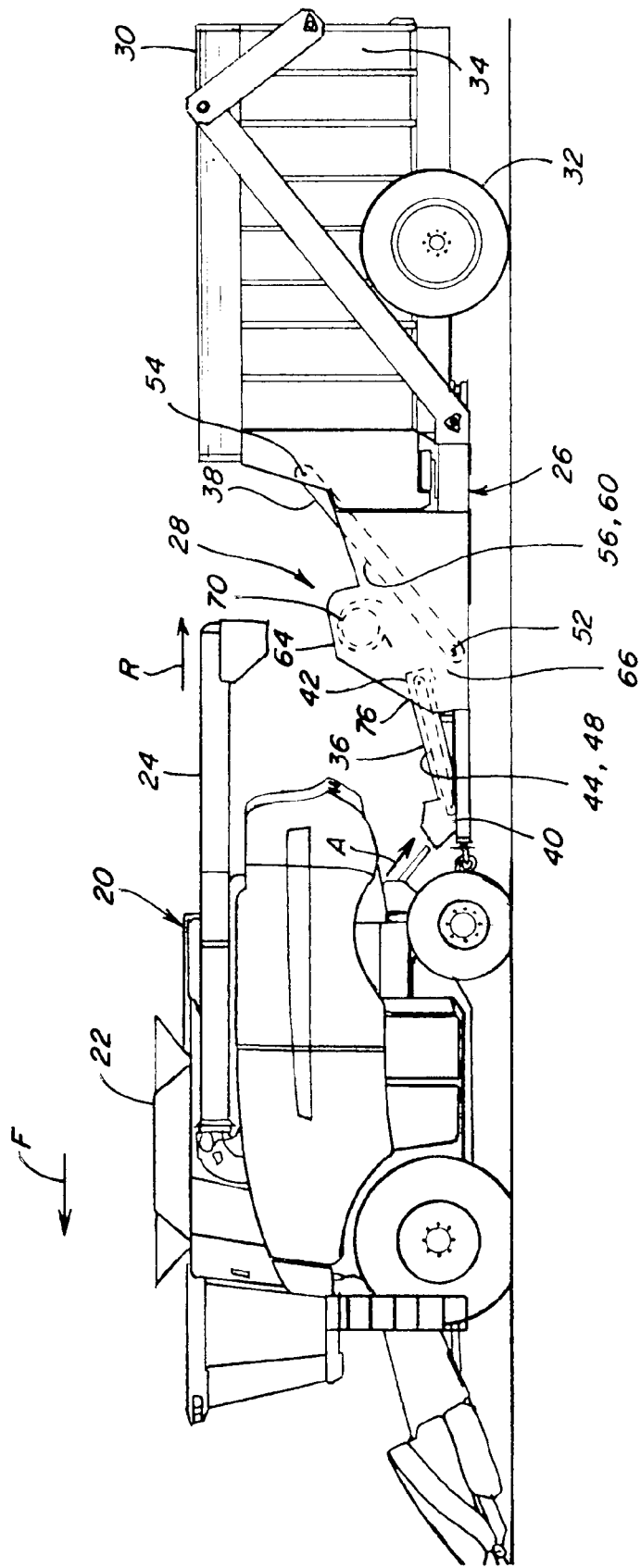
FIG. 1 is a side view of an agricultural harvesting machine towing a trailer including a corn cob cleaning conveyor system of the invention, and a cob collection container.
Figure 2:
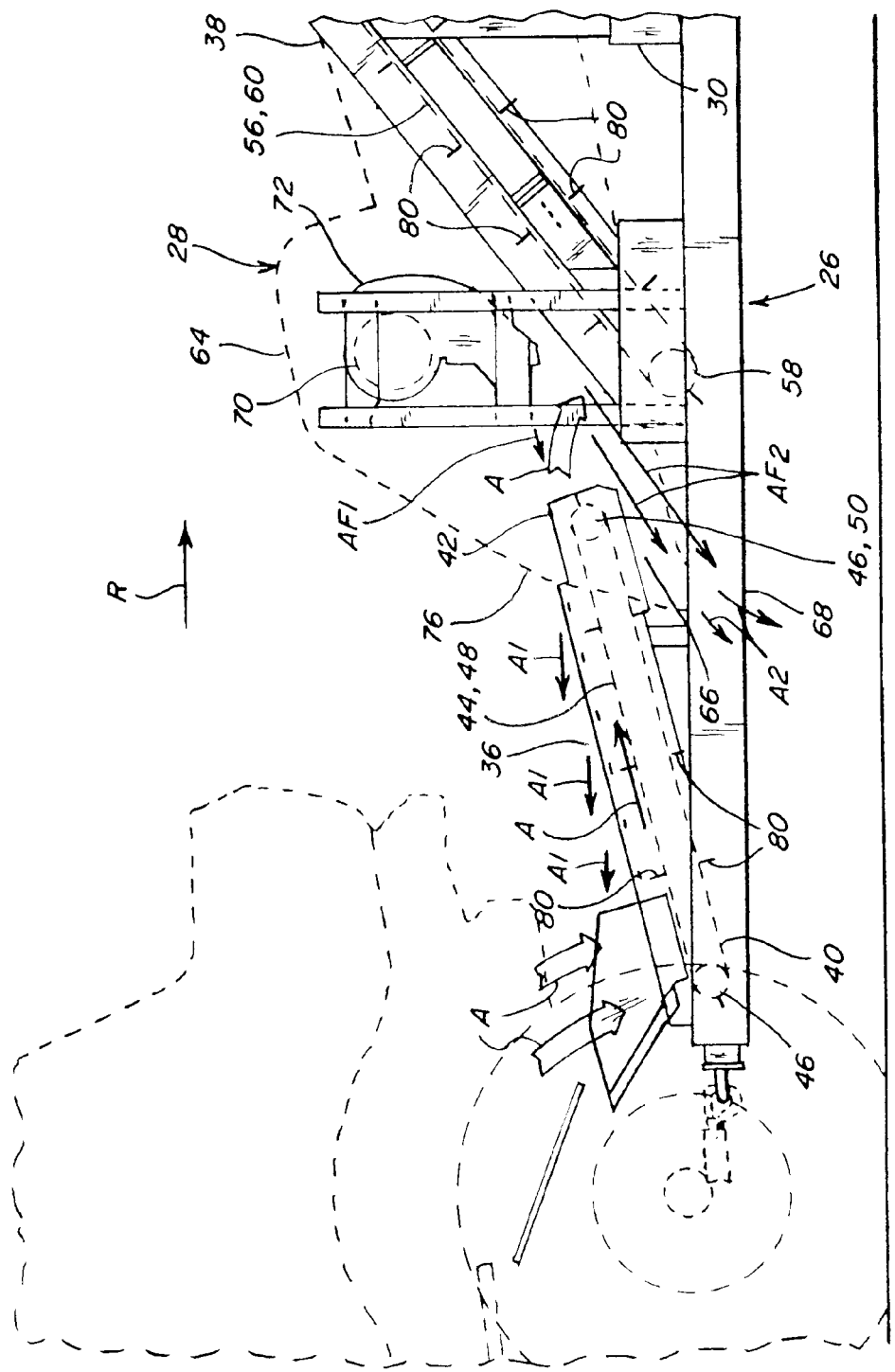
FIG. 2 is a fragmentary side view of the trailer and conveyor system, with outer structural aspects of the system in dotted lines to reveal internal aspects thereof.
Figure 3:
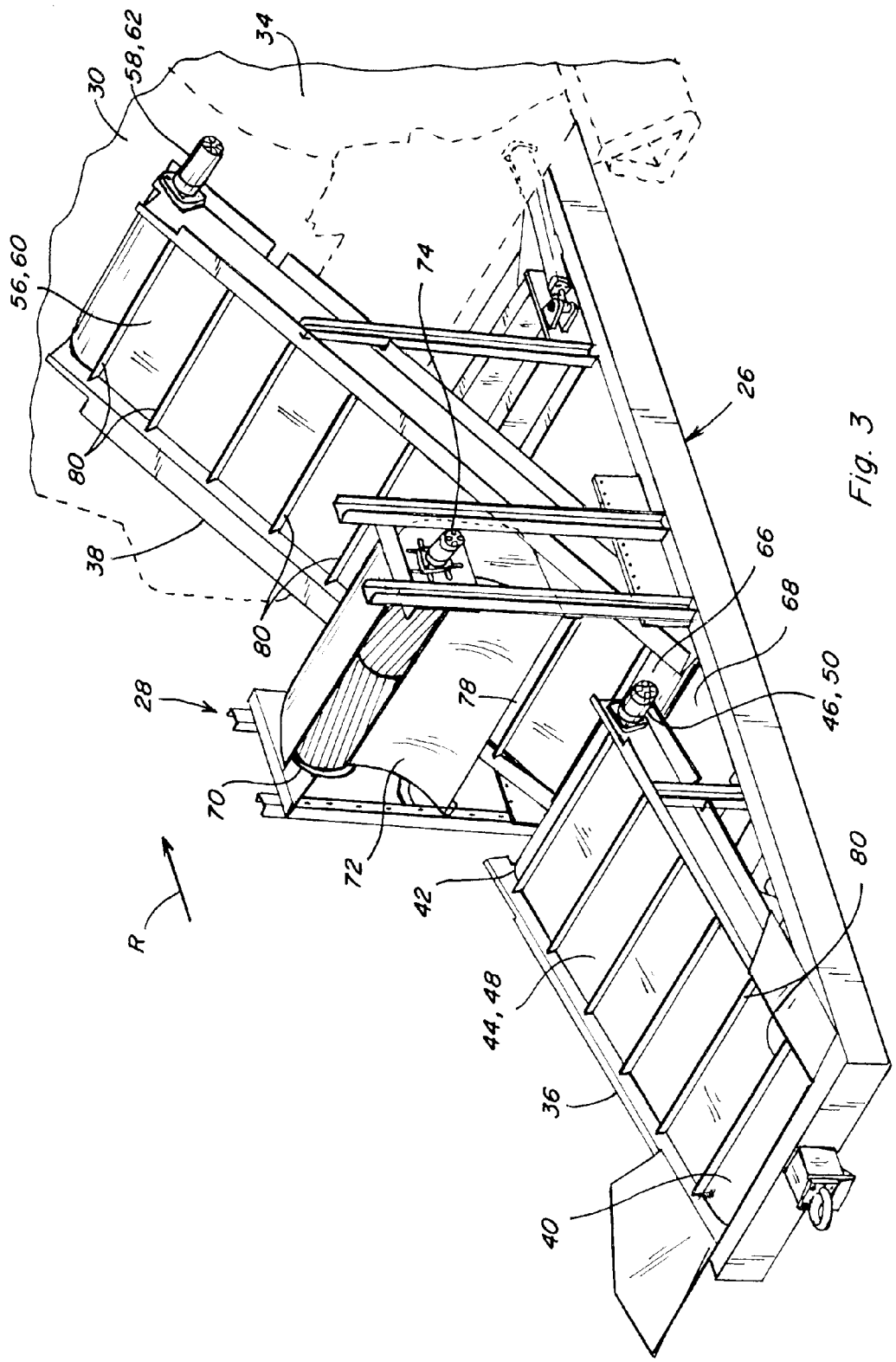
FIG. 3 is a fragmentary perspective view of the trailer with the outer structural aspects removed to show the conveyor system.
Figure 4:
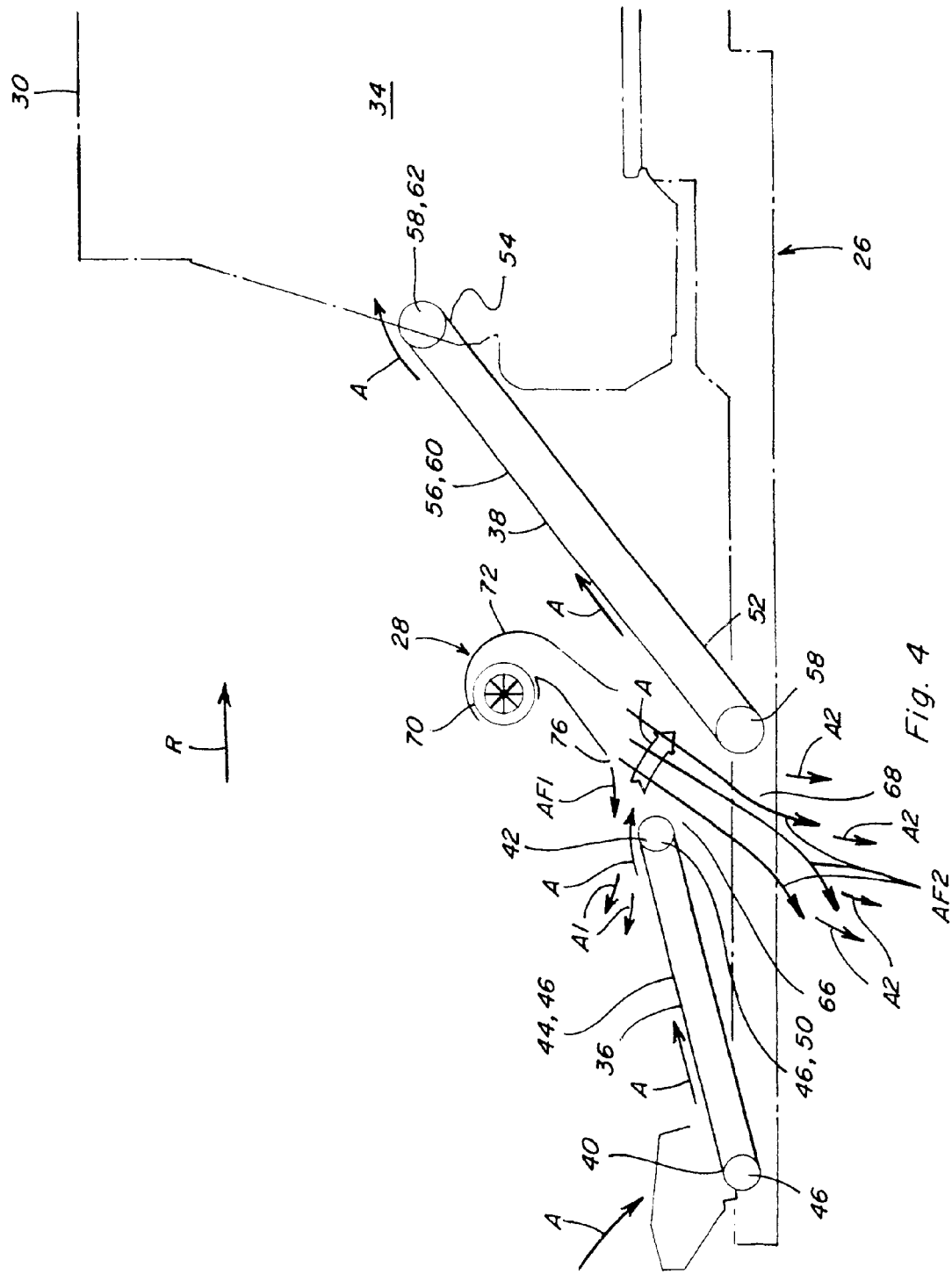
FIG. 4 is a simplified schematic side view of aspects of the trailer and conveyor system, illustrating aspects of operation thereof.

Referring now the drawings, in FIG. 1, a representative agricultural harvesting machine 20 is shown, which is a combine constructed and operable in the well known manner for travel in a forward direction, denoted by arrow F, for harvesting whole ears of corn from corn plants as the machine travels over a field. Machine 20 includes well known apparatus (not shown) that gathers and conveys the ears of corn into a threshing system within the machine which removes most of the husk surrounding the ears, and the corn kernels from cobs of the ears, and directs a flow of the corn, cobs, or fragments thereof, and other residue or stover, within a rear chamber of machine 20 to a cleaning system thereof. At the same time, larger residue such as leaves and the like, are directed within the rear chamber to a spreader on the rear end of the machine (removed here for clarity). The cleaning system of machine 20 is operable in the conventional manner to separate the cobs and other larger elements of the corn residue or stover from the kernels of corn and smaller elements of residue, and the corn is collected and conveyed into a clean grain tank 22 on machine 20, or other receiver, while the cobs and other larger elements of the residue are discharged from the rear of the cleaning system, as denoted by arrow A. The clean corn is then unloaded from tank 22 using an unloader conveyor 24 in the conventional manner, by swinging conveyor 24 to a sidewardly extending position (not shown—conveyor 24 being illustrated in a stowed or travel position here).

Referring also to FIGS. 2, 3, 4 and 5, a trailer 26 is shown connected in towed relation to a rear end of machine 20, carrying a cob cleaning conveyor system 28 constructed and operable according to the teachings of the present invention, for receiving the flow of cobs and other elements of corn residue or stover denoted by arrow A, cleaning or removing loose husks and other lighter elements of the residue from the cobs, and directing the clean cobs into a cob collection container or device 30 also carried on trailer 26. Here, although cob collection device 30 is configured to be located and supported on trailer 26 suitably supported on wheels 32, or tracks (not shown) for towing by machine 20, it is likewise contemplated that device 30 could be incorporated into the structure of the harvesting machine with which it is used, e.g., machine 20, or it can be self-propelled, or otherwise moved in a manner adequate for receiving a flow of cobs from the harvesting machine. Likewise, although conveyor system 28 of the invention is illustrated as being carried on trailer 26, alternatively, it could be carried on a self propelled vehicle, or incorporated into the machine from which it receives corn residue, with equal utility. Cob collection device 30 generally includes an upstanding wall structure 34 bounding an interior cavity or chamber adapted for receiving and holding a quantity of cobs.

Cob cleaning conveyor system 28 includes a first conveyor 36 and a second conveyor 38 configured and operable for conveying corn residue including cobs and other material lighter than the cobs, rearwardly as denoted by arrows R. First conveyor 36 has a first end 40, an opposite second end 42, and an endless belt 44 encircling rollers 46 at ends 40, 42, so as to have an upwardly facing surface 48. The roller 46 at end 42 is a drive roller connected to and rotatably driven by a drive 50 which can comprise, for instance, but is not limited to, a fluid motor, electric motor, chain drive, belt drive, or the like, operable for driving belt 44 such that surface 48 moves in the rearward direction R. Similarly, second conveyor 38 has a first end 52, an opposite second end 54, and an endless belt 56 encircling rollers 58 at ends 52, 54, so as to have an upwardly facing surface 60. Roller 58 at end 54 is a drive roller connected to and rotatably driven by a drive 62 which again can comprise, for instance, but is not limited to, a fluid motor, electric motor, chain drive, belt drive, or the like, operable for driving belt 56 such that surface 60 moves in direction R.

It can be observed that conveyors 36 and 38 are disposed such that second end 42 of first conveyor 36 is spaced above first end 52 of second conveyor 38 and with a housing 64 defines an enclosed gap or passage 66 thereover through which a flow of corn residue, denoted by arrows A, conveyed over second end 42 of first conveyor 36 will be propelled in an airborne manner so as to fall onto first end 52 of second conveyor 38, conveyors 36, 38 being spaced apart defining an opening 68 therebetween at a lower end of passage 66. At least second conveyor 38 is inclined upwardly toward second end 54 thereof, such that, during operation of the conveyors, corn residue deposited on the first conveyor (arrow A) will be conveyed thereby so as to be propelled over second end 42 so as to fall through passage 66 onto first end 52 of second conveyor 38, so as to be conveyed upwardly thereby over second end 54 and into collection device 30.

Here, it should be noted that a suitable angle of inclination of second conveyor 38 relative to horizontal for a variety of applications has been found to be between about 30 and about 45 degrees, an angle toward the upper end of this range being shown here. Inclining conveyor 38 is advantageous, as during operation, as the corn residue impinges surface 60, some of it will roll and tumble therealong, even downwardly, so as to release loose husks and other lighter elements of the residue from the cobs. Also, the inclination will facilitate the propulsion of the cobs by conveyor 38 deeper into collection device 30. The angle of conveyor 38 can also be varied, for achieving a desired cleaning effect and for distributing the clean cobs more evenly throughout collection device 30.

It should also be noted that conveyor 36 is shown inclined, but at a lesser angle, here, selected from a range of between about 10 degrees and about 20 degrees relative to horizontal. This is advantageous as it allows the flow of cobs from conveyor 36 to conveyor 38 to be airborne longer, for increased cleaning effect, as will be explained.

System 28 of the invention importantly also includes a fan 70 configured and operable for directing a flow or flows of air downwardly through residue flow A for separating and cleaning or removing the loose, lighter elements of the other corn residue, namely husks, leaves and fragments, from the cobs, and discharging the lighter other elements onto the ground. In system 28 as illustrated in FIGS. 1 through 5, fan 70 is shown disposed above passage 66 and the lower first end 52 of second conveyor 38. In a second cob cleaning conveyor system 78 of the invention shown in FIGS. 6 through 15, fan 70 is shown disposed above second end 54 of conveyor 38. In both instances, fan 70 is preferably a centrifugal type fan having a sideward extent about equal to the width of conveyor 36 or conveyor 38, and enclosed in a housing or wrapper 72 configured for directing the air flow output downwardly in a desired manner. Fan 70 is powered in a conventional well known manner, using a fluid or electric motor 74, belts, or the like, and is configurable in a number of ways for accommodating a variety of different conditions, which can include, for instance, smaller or larger cobs, more or less cob fragments, and a greater or lesser relative percentage of lighter elements of corn residue such as husks and leaves, different overall residue volumes, moisture levels, and the like.

Figure 5:
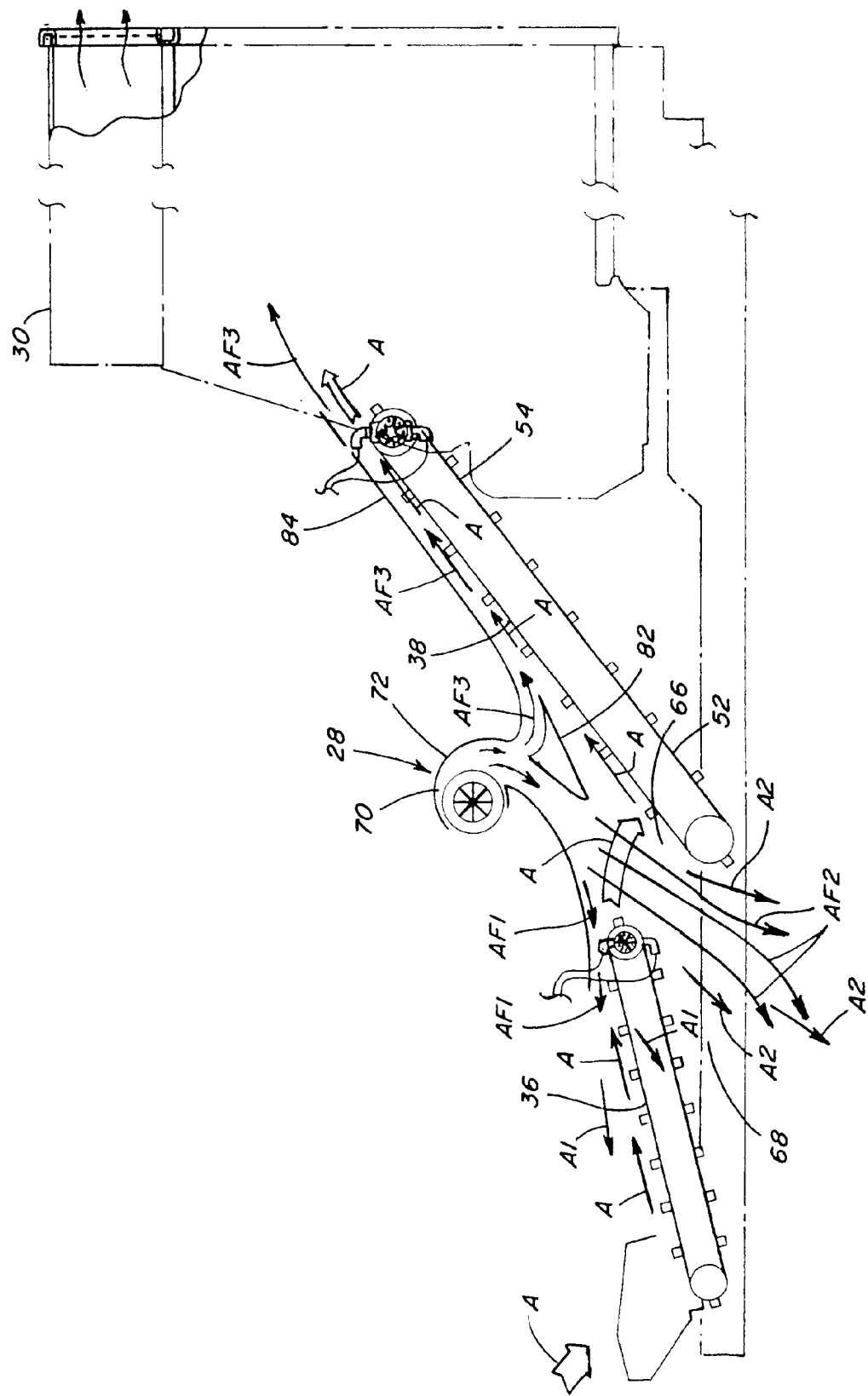
FIG. 5 is a simplified schematic side view of the trailer, showing an embodiment of the cob cleaning conveyor system according to the invention, which is a variant of the system of FIG. 1.

As a non-limiting example in regard to system 28, the air flow output of fan 70 can be split into a first air flow AF1 over 48 surface of first conveyor 36, and a second air flow AF2 downwardly through passage 66. As another option, the air flow output can be directed mostly as just air flow AF1 over conveyor 36, or substantially as just air flow AF2 through passage 66. As still another optional configuration, as illustrated in FIG. 5, a portion of the output can be directed upwardly along conveyor 38 as air flow AF3, in combination with air flow AF1 and/or air flow AF2, for following the residue flow A upwardly along conveyor 38.

Air flow AF1 will travel over or through residue flow A on conveyor 36, for removing at least some of any loose, lighter elements of the residue, namely, husks and leaves, and carry them away forwardly, in the opposite direction of flow A, as denoted by arrows A1. Air flow AF1 can be powerful enough and directed accordingly, to agitate and rake at least the upper portions of residue flow A on the surface of conveyor 36 for this purpose. Also, an opposing air flow discharged from the rear of machine 20 may be present, which can intermix with air flow AF1 to increase turbulence and agitation over the open region of conveyor 36, which can aid the sideward dispersal of the elements of crop residue onto a field.

Air flow AF2 of system 28 has a relatively steep angle of attack relative to residue flow A propelled from conveyor 36, so as to have a shearing effect, and so as to mix with the residue in passage 66, and it will mix also with any air flow generated by the operation of conveyors 36 and 38. In this regard, conveyor 38 will be moving upwardly through passage 66 at a high rate of speed, and includes slats 80 which will generate a counter flow of air traveling upwardly through passage 66. Conveyor 36 similarly includes slats 80 and will generate a flow of air in the rearward direction R into passage 66, generally parallel to residue flow A. This combination of air flows will result in air turbulence which will facilitate separation of the lighter elements of residue from the heavier cobs, as depicted by the larger arrows A in passage 66. This action is facilitated by the higher mass of the cobs and cob fragments, which gives them greater momentum, and they are more aerodynamic, so as to be capable of more easily crossing passage 66, whereas the husks, leaves and fragments thereof, because of their lower mass and more paper-like consistency, are more easily and readily redirected and carried away by air flow AF2. As a result, with fan 70 disposed and directing air flows AF1 and AF2 as shown, a cleaning action wherein substantially all of the cobs are propelled across passage 66, and the lighter other elements of the residue flow A are redirected and carried downwardly through and from passage 66, as denoted by arrows A2, is achieved.

As another feature of the cleaning capability of system 28, as a result of the steep angle of inclination of conveyor 38, the relatively high speed of operation thereof, and the volume of cobs conveyed thereby, the cobs will have a tendency to be tumbled along conveyor 38, to aid in release of at least some of any remaining lighter elements of residue, as will be explained and illustrated below.

Referring more particularly to FIG. 5, a portion of the output of fan 70 is shown being diverted by a flow diverter 82 as air flow AF3, upwardly along conveyor 38, through a duct 84 covering the upper region of that conveyor. This flow will travel with or follow and facilitate the upward conveyance of flow A, now substantially all cobs, en route to device 30.

Figure 6:
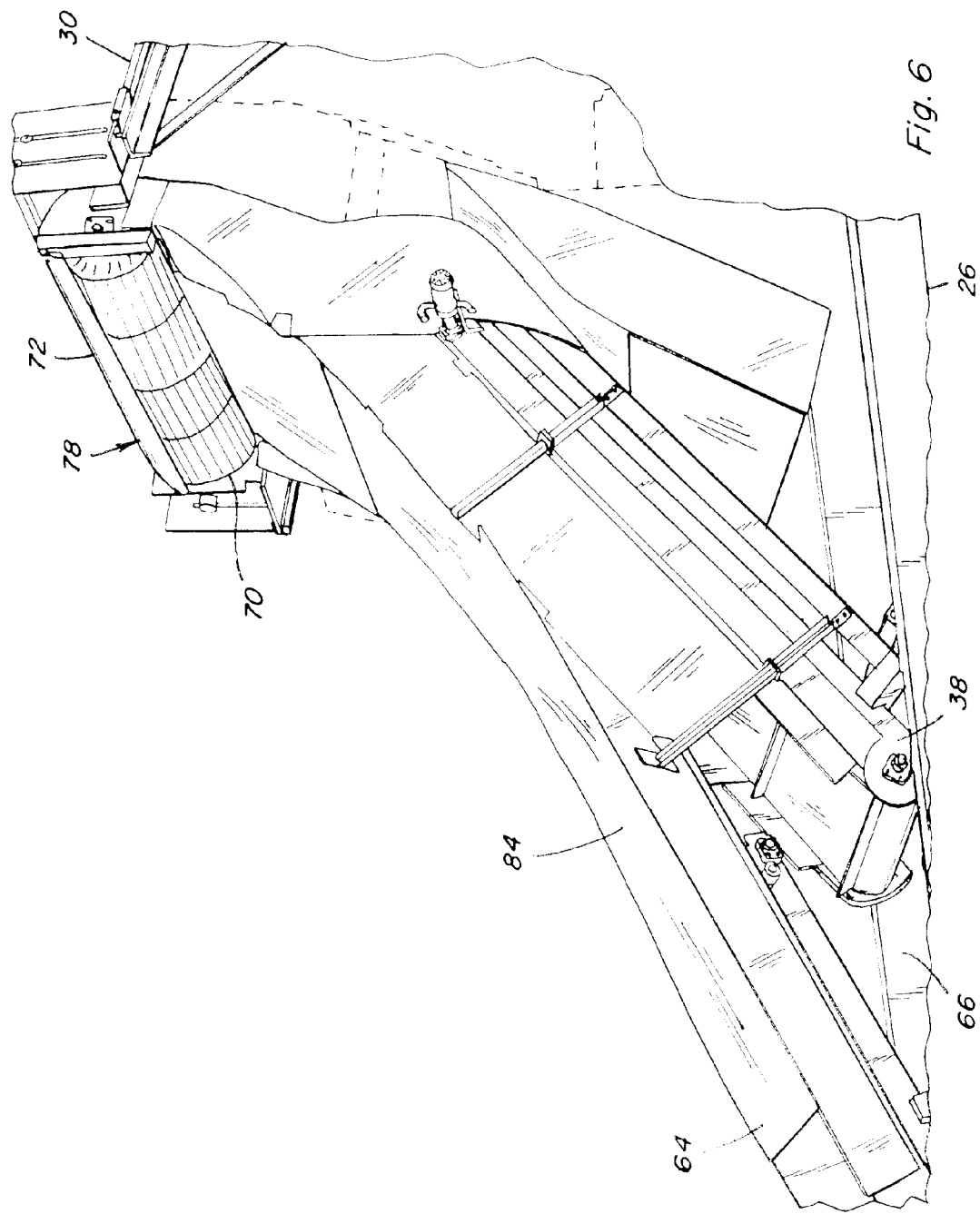
FIG. 6 is a fragmentary perspective view of the trailer and cob collection container, showing an alternative embodiment of a cob cleaning conveyor system of the invention, with a panel of a housing removed to show interior aspects of the system.
Figure 7:
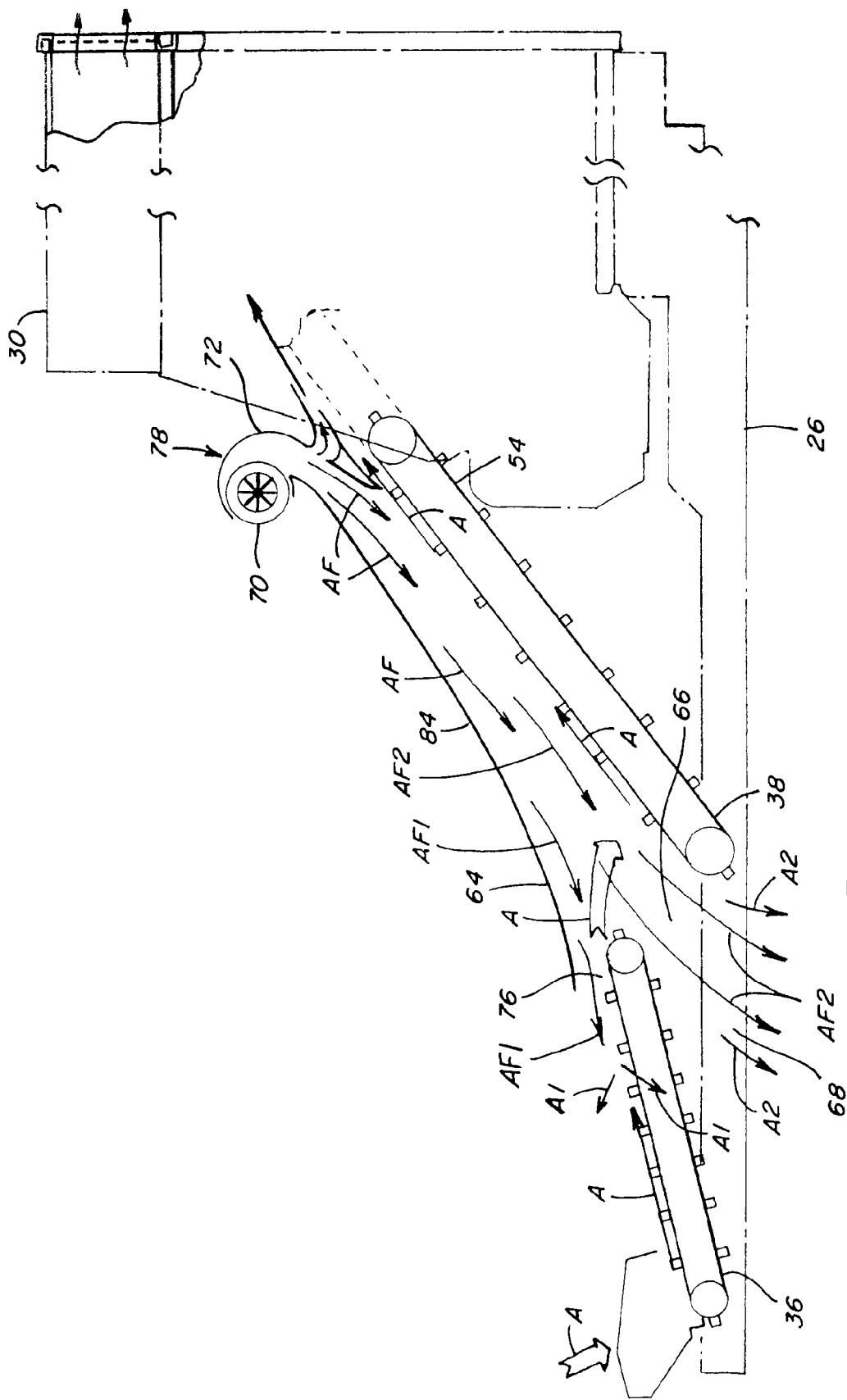
FIG. 7 is a simplified schematic side view of aspects of the trailer and conveyor system of FIG. 6, illustrating aspects of operation thereof.
Figure 8:
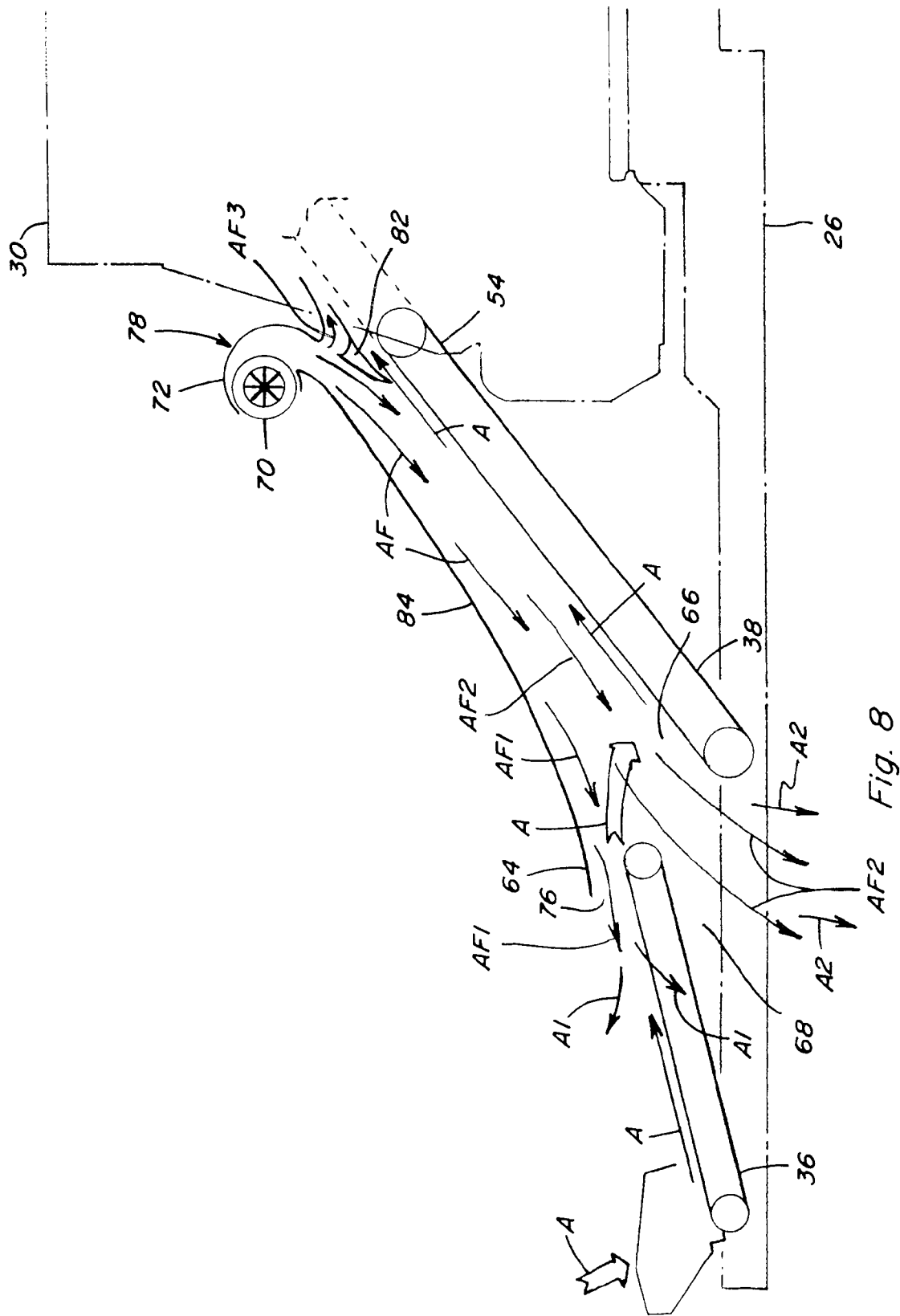
FIG. 8 is another simplified schematic side view of the trailer and a variant of the system of FIG. 6.
Figure 9:
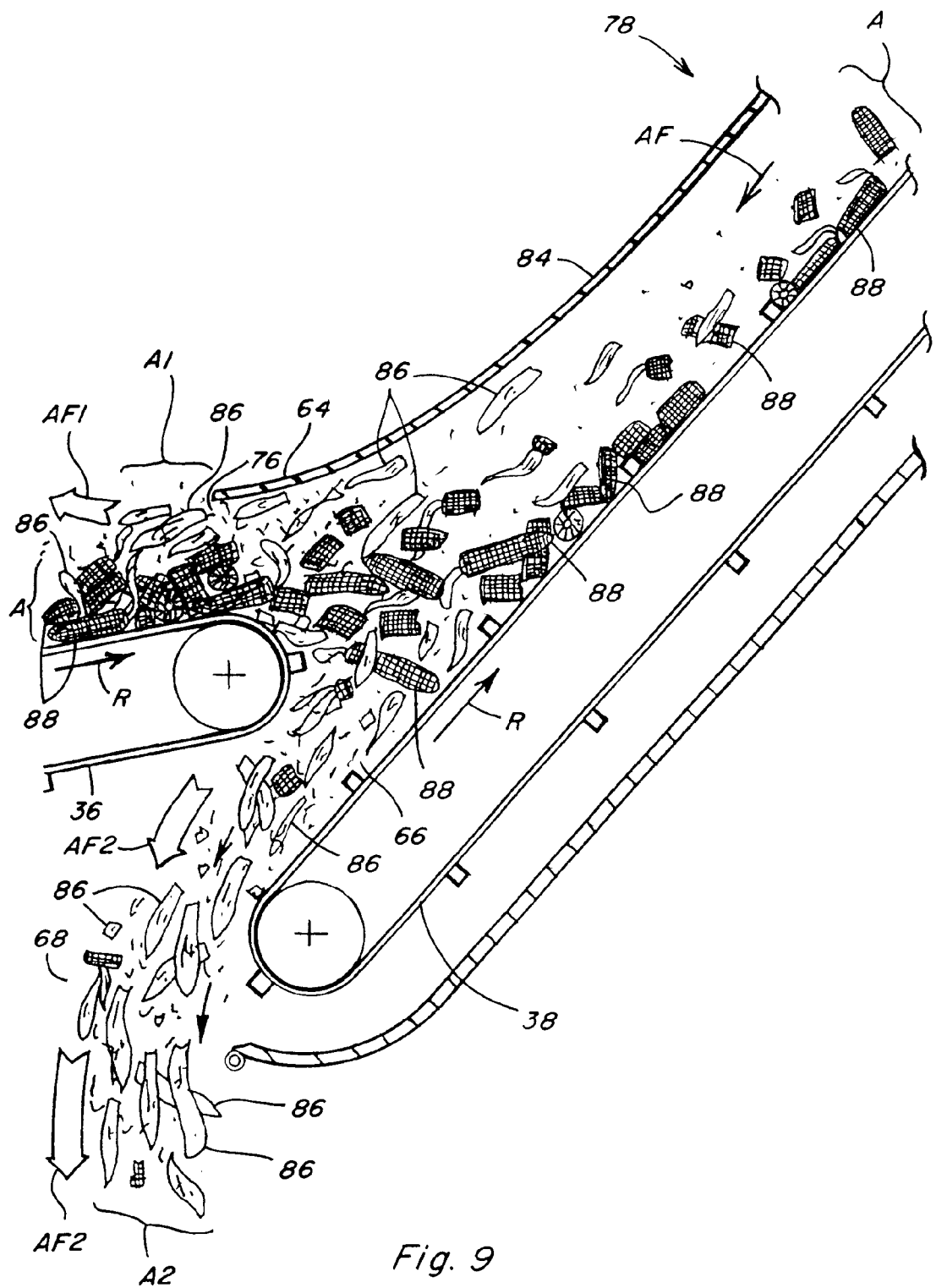
FIG. 9 is an enlarged side view of the conveyor system of FIG. 6, showing agitation and the cleaning action of the system.
Figure 10:
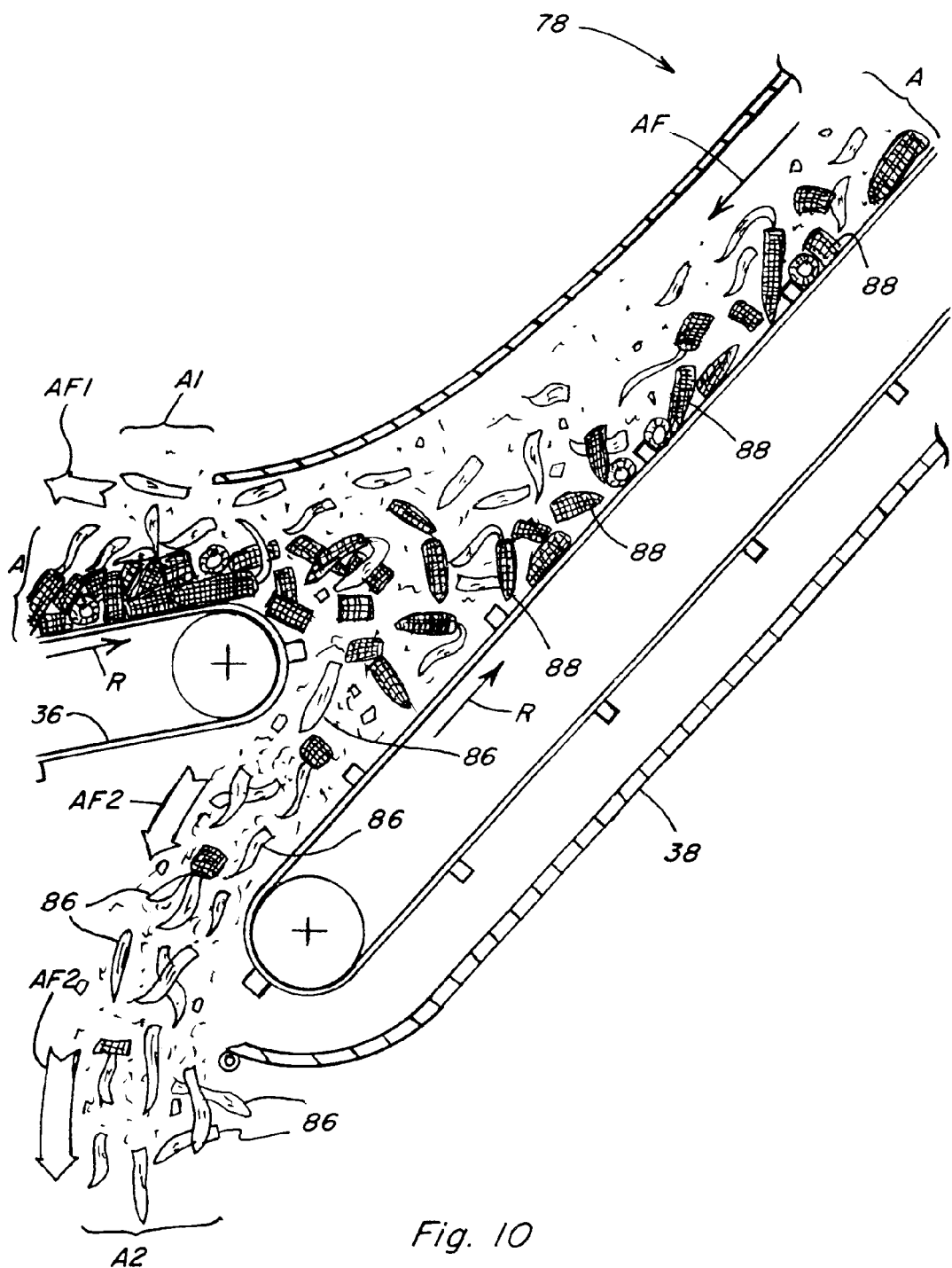
FIG. 10 is another enlarged side view of the conveyor system of FIG. 6, showing the agitation and cleaning action of the system.

Referring more particularly to FIGS. 6 through 8, fan 70 and wrapper 72 of system 78 of the invention are configured for directing the air flow output AF downwardly through duct 84 above conveyor 38, and into housing 64 enclosing passage 66, which is integrated with the lower end of duct 84. Again, the output will be split into air flow AF1 that will flow outwardly through opening 76, carrying lighter elements of crop residue A1, and air flow AF2 that will flow downwardly through passage 66 and outwardly through opening 68, carrying additional lighter elements of crop residue A2, in the above described manner. Here, it can be observed that since the air flow output of fan 70 is directed by duct 84, it will enter passage 66 at about the angle of inclination of conveyor 38, which is still downwardly, but less so than the flow direction and shearing action achieved by locating the fan in the position of FIGS. 1 through 5.

As one advantage of the configuration of FIGS. 6 through 8, the air flow down duct 84 can pick up some of the lighter elements residue flow A remaining in the upward flow conveyed by second conveyor 38. As another advantage, the air flow will enter passage 66 at a location closer to first end 52 of the second conveyor, where the lighter elements of the residue will have less remaining momentum and will thus be easier to redirect downwardly through opening 68.

Referring more particularly to FIG. 8, as another variant of the invention, a flow diverter 82 can be disposed below fan 70, in a position for directing a portion of the air flow output toward cob collection device 30, to so as to travel with flow A and facilitate its passage into that container.

Referring more particularly to FIGS. 9, 10, 11 and 12, the cleaning operation and effect of the cob cleaning conveyor systems of the invention is illustrated by system 78. The flow of crop residue A is conveyed by conveyor 36 into housing 64 through opening 76, where it is propelled into passage 66. At the same time air flow AF flows downwardly through duct 84 and splits into air flows AF1 and AF2. Air flow AF1 passes over flow A and out of housing 64 through opening 76, and carries with it some of the lighter elements of flow A, namely, loose husks, leaves and fragments, generally denoted by number 86.

In passage 66, air flow AF2 flows counter to the direction of flight of residue flow A, such that elements 86 and cobs 88 separate, as a result of the conditions mentioned above, namely, that cobs 88 are heavier and more aerodynamic and thus have more momentum and can travel a greater distance through passage 66, and lighter elements 86 are more paper like and become more caught up in the air flow AF2 flowing in the opposite direction. There is also turbulence created by the operation of the conveyors and the diverging air flows AF1 and AF2 as also mentioned above. These factors all contribute to the separation and removal of the lighter elements 86 from the cobs 88. The lighter elements 86 are then carried by air flow AF2 downwardly toward opening 68 through which they are discharged as flow A2, and flow A, mostly now cobs 88, continues upwardly along second conveyor 38.

Figure 11:
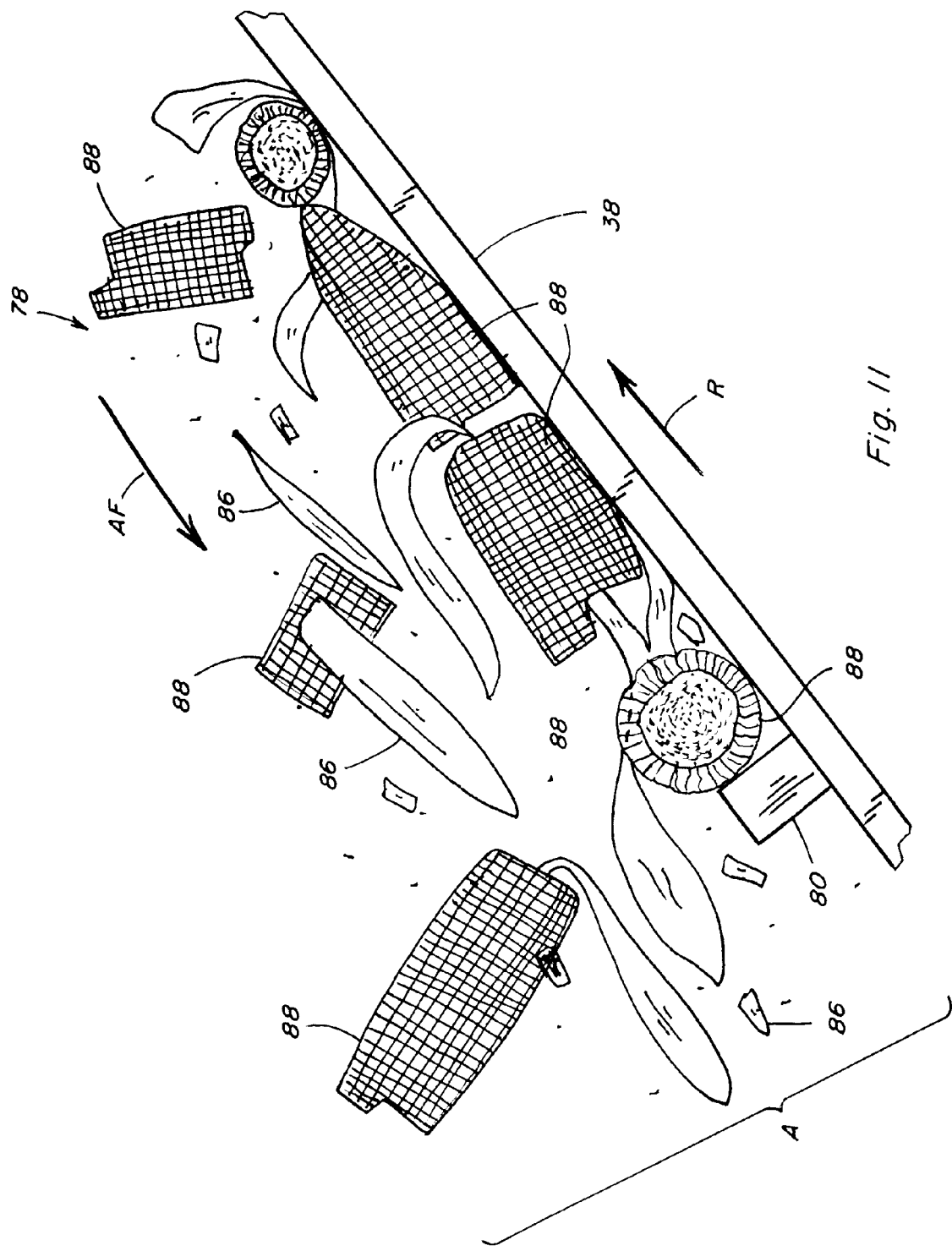
FIG. 11 is a more enlarged side view of the conveyor system of FIG. 6, showing the agitation and cleaning action of the system.
Figure 12:
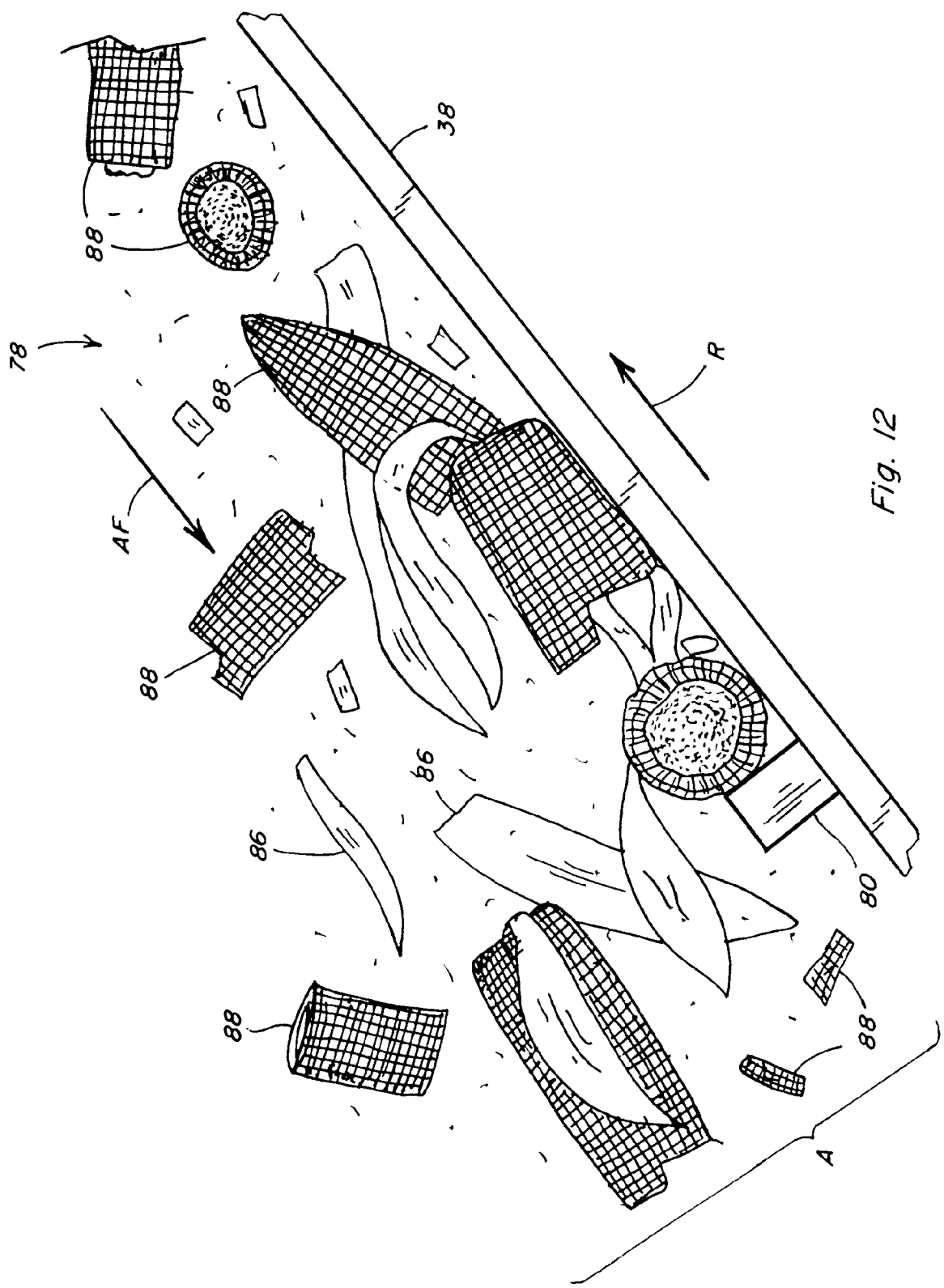
FIG. 12 is another more enlarged side view of the conveyor system of FIG. 6, showing the agitation and cleaning action of the system.
Figure 13:
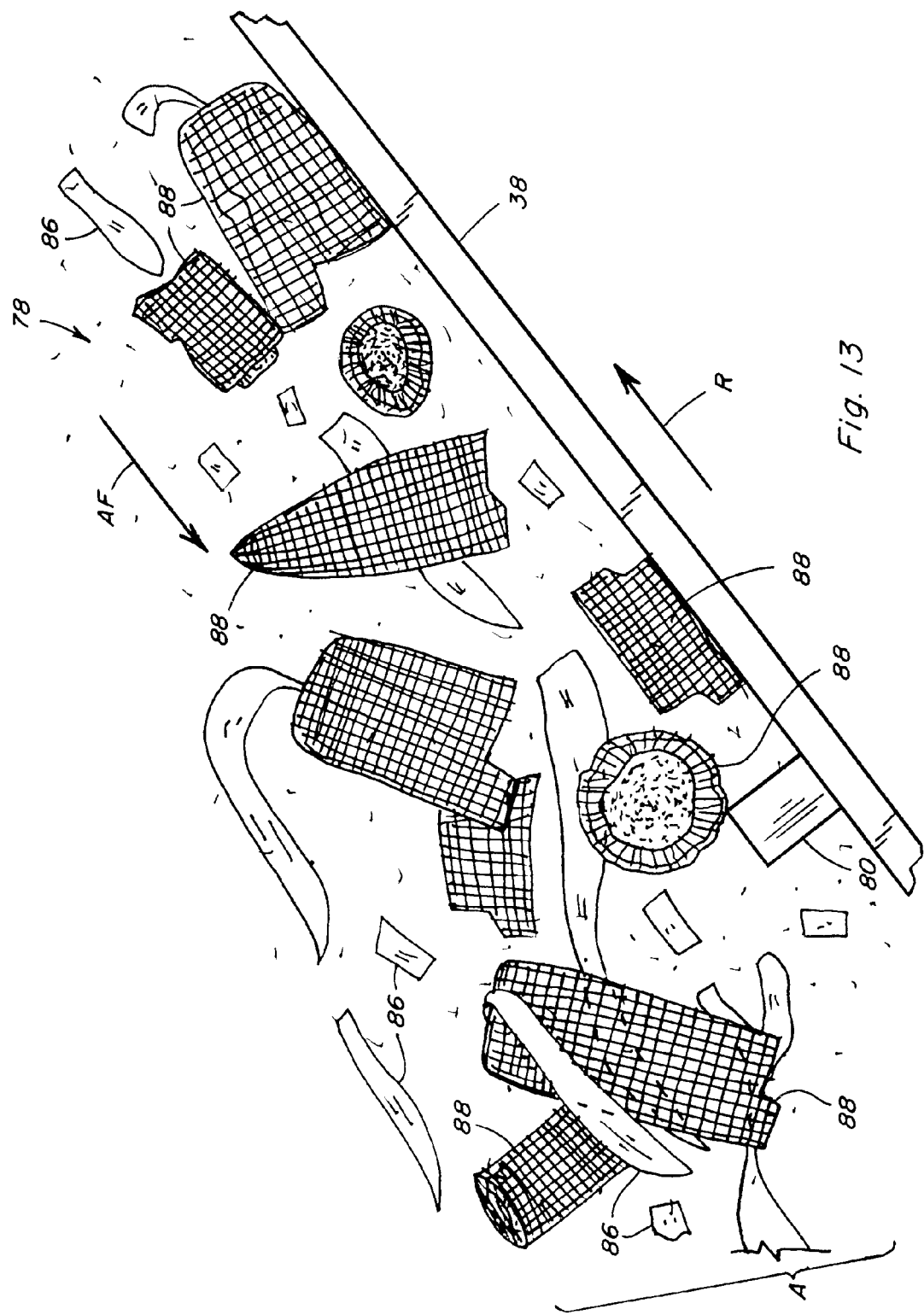
FIG. 13 is still another more enlarged side view of the conveyor system of FIG. 6, showing the agitation and cleaning action of the system.

Referring more particularly to FIGS. 11, 12 and 13, flow A of mostly cobs 88 as conveyed by second conveyor 38 of system 78 in direction R, is shown, illustrating a sequence of the tumbling of cobs 88 to release at least some of the remaining lighter elements 86 of the flow, which will be carried by the air flow downwardly through the duct. The same slat 80 and cobs 88 are depicted in the sequence, to illustrate the tumbling of individual cobs. It can be observed that most of cobs 88 will gradually settle against slat 80 during the upward movement thereof. Attached husks are pulled in the downstream direction by air flow AF. Vibratory movements of the trailer resulting from travel over rough fields, furrows, and the like, will contribute to the tumbling effect.

Figure 14:
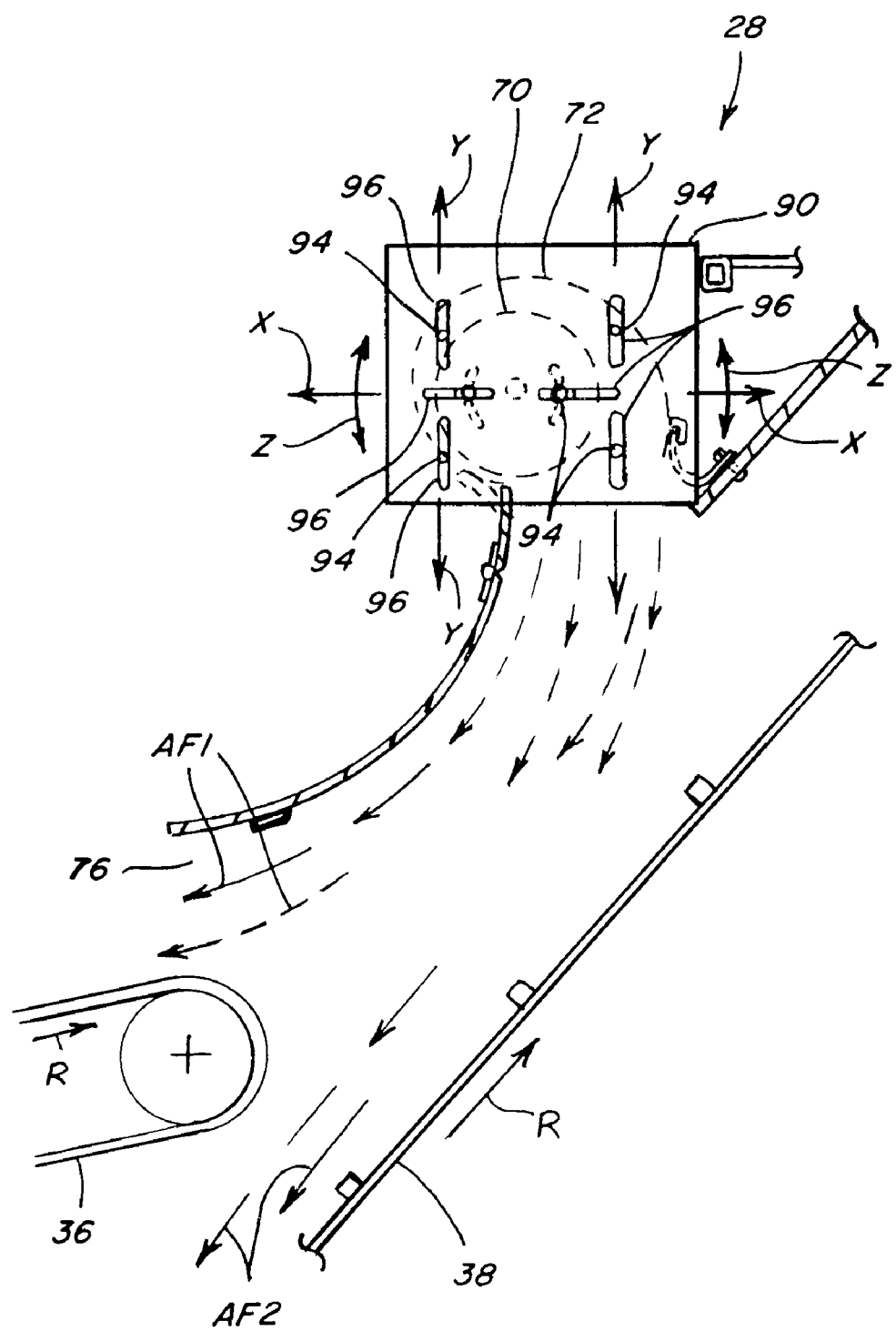
FIG. 14 is a simplified schematic side view of the system of FIG. 1, illustrating adjustability of the fan thereof.

Referring also to FIG. 14, as another feature of the invention, fan 70 and wrapper 72 are adjustable for varying air flows AF1 and AF2, as illustrated by fan 70 of system 28. In particular, fan 70 and wrapper 72 can be moved fore and aft, as denoted by arrows X, and upwardly and downwardly, as denoted by arrows Y, and as desired or required for obtaining a desired air flow distribution. Wrapper 72 can also be rotated, as denoted by arrow Z, to adjust the direction of air flow so as to have a lower angle of attack, that is, to be more parallel to conveyor 36, or a higher angle of attack, that is, at a greater angle relative thereto, as desired or required for obtaining desired characteristics. To achieve these capabilities, fan 70 and or wrapper 72 are mounted to supporting structure 90 using suitable fasteners 92, e.g., bolts or the like, received and movable within slots 94 to position the fan or wrapper as desired, and then fixable for holding it in place.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A corn cob cleaning conveyor system, comprising:
   a first conveyor and a second conveyor configured and operable for conveying corn residue including cobs and other material lighter than the cobs, each of the conveyors having a first end, an opposite second end, and an upwardly facing movable surface extending between the first end and the second end, the conveyors being disposed such that the second end of the first conveyor is spaced above the first end of the second conveyor and with other structure of the system defines an enclosed passage therethrough through which corn residue conveyed over the second end of the first conveyor will fall in an airborne manner onto the first end of the second conveyor, the conveyors being spaced apart defining an opening therebetween at a lower end of the passage, and at least the second conveyor being inclined upwardly toward the second end thereof, such that, during operation of the conveyors, corn residue deposited on the first conveyor will be conveyed thereby over the second end thereof so as to fall through the passage onto the first end of the second conveyor and be conveyed upwardly thereby over the second end thereof;
   a fan disposed generally above the second conveyor and operable for generating a positive air flow output, the air flow output is directed downwardly and split in a predetermined manner into first and second air flows, the first air flow passes downwardly over the upwardly facing surface of the first conveyor and the second air flow passes downwardly through the passage, such that the downward first air flow will remove at least some of the lighter other material from the residue flow conveyed by the first conveyor and the downward second air flow will cooperate with the operation of the second conveyor to agitate the airborne flow of the residue and the residue conveyed by the second conveyor so as to separate and remove at least some of the lighter other material therefrom.

2. The system of claim 1, comprising a duct over the second conveyor and wherein the fan is disposed above the second end of the second conveyor in a position to direct the air flow output downwardly through the duct such that the output is split into the first air flow and the second air flow in an upper end of the passage.

3. The system of claim 2, further comprising a cob collection container positioned adjacent to the second end of the second conveyor for receiving the residue conveyed thereover, and wherein the fan is configured to direct a portion of the air flow output so as to flow into the container with the residue.

4. The system of claim 1, wherein the fan is adjustable for relatively varying the first and second air flows.

5. The system of claim 1, wherein the second end of the first conveyor, the first end of the second conveyor, and the fan are arranged and configured such that the airborne flow of the residue will be tumbled by the operation of the conveyors and the fan.

6. The system of claim 1, wherein at least the movable surface of the second conveyor comprises a plurality of spaced apart sidewardly extending slats operable for carrying the residue upwardly therealong and for agitating the residue in cooperation with the second air flow.

7. The system of claim 1, wherein the second conveyor is oriented at an angle of inclination of about 30 degrees to about 45 degrees relative to horizontal.

8. The system of claim 1, wherein the first conveyor is oriented at an angle of inclination of about 10 degrees to about 20 degrees relative to horizontal.

9. The system of claim 1, wherein the conveyor system, the fan and a cob collection container disposed for receiving the flow of residue from the second conveyor, are carried on a trailer configured to be towed by a corn harvester.

10. The system of claim 9, comprising a duct covering the second conveyor and the second end of the first conveyor, and wherein the fan is located adjacent to the second end of the second conveyor and is configured and operable for directing a portion of the air flow output into the cob collection container with the residue, and for directing another portion of the air flow output downwardly through the duct so as to be split into the first and second air flows.

11. A corn cob cleaning conveyor system, comprising:
    a first conveyor and a second conveyor configured and operable for conveying corn residue including cobs and other material lighter than the cobs, each of the conveyors having a first end, an opposite second end, and an upwardly facing movable surface extending between the first end and the second end, the conveyors being disposed such that the second end of the first conveyor is spaced above the first end of the second conveyor;
    a housing disposed about the second end of the first conveyor and the first end of the second conveyor, defining and enclosing a passage having a first opening over the movable surface of the first conveyor and a second opening below the first end of the second conveyor, and at least the second conveyor being inclined upwardly toward the second end thereof, such that, during operation of the conveyors, corn residue deposited on the first conveyor will be conveyed thereby over the second end thereof so as to fall through the passage onto the first end of the second conveyor and be conveyed upwardly thereby over the second end thereof;

a fan disposed in an upper region of the housing generally above the first end of the second conveyor and operable for generating a positive air flow output, the air flow output is directed downwardly and split in a pre-determined manner into first and second air flows, the first air flow passes downwardly over the upwardly facing surface of the second end of the first conveyor and the second air flow passes downwardly through the passage and over the first end of the second conveyor, such that the downward first air flow will remove at least some of the lighter other material from the residue flow conveyed by the first conveyor and discharge the removed material through the first opening, and the downward second air flow will cooperate with the operation of the second conveyor to agitate the airborne flow of the residue so as to separate at least some of the other material therefrom and discharge the separated material through the second opening.

12. The system of claim 11, wherein the fan is adjustable for relatively varying the first and second air flows.

13. The system of claim 11, wherein the second end of the first conveyor, the first end of the second conveyor, and the fan are arranged and configured such the airborne flow of the residue will be tumbled by the operation of the conveyors and the fan.

14. The system of claim 11, wherein at least the movable surface of the second conveyor comprises a plurality of spaced apart sidewardly extending slats operable for carrying the residue upwardly therealong and for agitating the residue in cooperation with the second air flow.

15. The system of claim 11, wherein the second conveyor is oriented at an angle of inclination of about 30 degrees to about 45 degrees relative to horizontal.

16. The system of claim 11, wherein the first conveyor is oriented at an angle of inclination of about 10 degrees to about 20 degrees relative to horizontal.

17. The system of claim 11, wherein the conveyor system, fan and a cob collection container disposed for receiving the flow of residue from the second conveyor, are carried on a trailer configured to be towed by a corn harvester.

18. A corn cob cleaning conveyor system, comprising:

a corn residue conveyor system including a first conveyor and a second conveyor configured and operable for conveying corn residue including cobs and other material lighter than the cobs, each of the conveyors having a first end, an opposite second end, and an upwardly facing movable surface extending between the first end and the second end, the conveyors being disposed such that the second end of the first conveyor is spaced above the first end of the second conveyor;

a housing disposed about the second end of the first conveyor and the second conveyor, defining and enclosing a passage having a first opening over the movable surface of the first conveyor and a second opening below the first end of the second conveyor, and at least the second conveyor being inclined upwardly toward the second end thereof, such that, during operation of the conveyors, corn residue deposited on the first conveyor will be conveyed thereby over the second end thereof so as to fall through the passage onto the first end of the second conveyor and be conveyed upwardly thereby over the second end thereof;

a fan disposed in an upper region of the housing generally above the second end of the second conveyor and operable for generating a positive air flow output directed downwardly through the housing over the second conveyor and which will split in a pre-determined manner into a first air flow passing downwardly over the upwardly facing surface of the second end of the first conveyor and a second air flow passing downwardly through the passage and over the first end of the second conveyor, such that the downward first air flow will remove at least some of the lighter other material from the residue flow conveyed by the first conveyor and discharge the removed material through the first opening, and the downward second air flow will cooperate with the operation of the second conveyor to agitate the airborne flow of the residue so as to separate at least some of the other material therefrom and discharge the separated material through the second opening.

19. The system of claim 18, wherein the fan is adjustable for relatively varying the first and second air flows.

20. The system of claim 18, wherein the second end of the first conveyor and the first end of the second conveyor are arranged and configured such the airborne flow of the residue will be tumbled by the operation of the conveyors and the fan.

21. The system of claim 18, wherein at least the movable surface of the second conveyor comprises a plurality of spaced apart sidewardly extending slats operable for carrying the residue upwardly therealong and for agitating the residue in cooperation with the second air flow.

22. The system of claim 18, wherein the second conveyor is oriented at an angle of inclination of about 30 degrees to about 45 degrees relative to horizontal.

23. The system of claim 18, wherein the first conveyor is oriented at an angle of inclination of about 10 degrees to about 20 degrees relative to horizontal.

24. The system of claim 18, wherein the conveyor system, fan and a cob collection container disposed for receiving the flow of residue from the second conveyor, are carried on a trailer configured to be towed by a corn harvester, and the fan is configured and operable for directing a portion of the air flow output into the container with the residue.

25. The system in claim 18 further comprising a flow diverter disposed generally below the fan in the housing, the flow diverter directs a portion of the air flow output upwardly toward the second end of the second conveyor.

* * * * *